(12) United States Patent
Uda et al.

(10) Patent No.: US 10,821,403 B2
(45) Date of Patent: Nov. 3, 2020

(54) SPIRAL WOUND SEPARATION MEMBRANE MODULE

(71) Applicant: NITTO DENKO CORPORATION, Osaka (JP)

(72) Inventors: Yasuhiro Uda, Osaka (JP); Toshiyuki Kawashima, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 48 days.

(21) Appl. No.: 15/768,979

(22) PCT Filed: Oct. 5, 2016

(86) PCT No.: PCT/JP2016/079631
§ 371 (c)(1),
(2) Date: Apr. 17, 2018

(87) PCT Pub. No.: WO2017/073279
PCT Pub. Date: May 4, 2017

(65) Prior Publication Data
US 2019/0060837 A1 Feb. 28, 2019

(30) Foreign Application Priority Data

Oct. 29, 2015 (JP) ................. 2015-212589

(51) Int. Cl.
*B01D 63/10* (2006.01)
*C02F 1/44* (2006.01)
*B01D 63/12* (2006.01)

(52) U.S. Cl.
CPC .............. *B01D 63/10* (2013.01); *B01D 63/12* (2013.01); *B01D 2313/143* (2013.01);
(Continued)

(58) Field of Classification Search
None
See application file for complete search history.

(56) References Cited

U.S. PATENT DOCUMENTS

| 6,139,750 A | 10/2000 | Graham |
| 2007/0199878 A1 | 8/2007 | Eisberg et al. |

(Continued)

FOREIGN PATENT DOCUMENTS

| JP | 56-62105 | 5/1981 |
| JP | 11-347378 | 12/1999 |

(Continued)

OTHER PUBLICATIONS

International Search Report issued in PCT/JP2016/079631, dated Nov. 8, 2016.

(Continued)

*Primary Examiner* — Chester T Barry
(74) *Attorney, Agent, or Firm* — Greenblum & Bernstein, P.L.C.

(57) ABSTRACT

The purpose of the present invention is to provide a highly reliable membrane module for removing hazardous components without the risk of a feed-source fluid and a concentrated fluid intermixing inside a hollow tube. The spiral wound separation membrane module is characterized in that: a spiral wound separation membrane element accommodated in a cylindrical container, the spiral wound separation membrane element having a structure in which a laminated body having a separation membrane, a feed-side spacer and a permeation-side spacer is wound around a porous hollow tube in a spiral shape, the feed-side spacer is positioned on a feed side of the separation membrane, the permeation-side spacer is positioned on a permeation side of the separation membrane, and a feed-side flow path and a permeation-side flow path are sealed so as not to communicate directly with each other.

1 Claim, 2 Drawing Sheets

(52) U.S. Cl.
CPC .. *B01D 2313/146* (2013.01); *B01D 2319/022* (2013.01); *C02F 1/44* (2013.01)

(56) References Cited

U.S. PATENT DOCUMENTS

2015/0068970 A1   3/2015  Cho et al.
2016/0354725 A1  12/2016  Kakigami et al.

FOREIGN PATENT DOCUMENTS

| JP | 2003-299937 | 10/2003 |
| JP | 2004-322013 | 11/2004 |
| JP | 2006-116523 | 5/2006 |
| JP | 2007-533451 | 11/2007 |
| JP | 2007-330946 | 12/2007 |
| JP | 2007330946 A * | 12/2007 |
| JP | 2010-115653 | 5/2010 |
| JP | 4688141 | 2/2011 |
| JP | 2015-120101 | 7/2015 |
| WO | 97/21630 | 6/1997 |
| WO | 2005/105274 | 11/2005 |
| WO | 2013/100133 | 7/2013 |
| WO | 2014/077414 | 5/2014 |

OTHER PUBLICATIONS

English translation of the International Preliminary Report on Patentability issued in PCT/JP2016/079631, dated May 11, 2018.
Office Action issued in Japan Counterpart Patent Appl. No. 2015-212589, dated Jul. 2, 2019, along with an English translation thereof.
Foreign Official Action issued in Japanese Patent Application No. 2015-212589, dated Jun. 3, 2020 and English translation thereof.

\* cited by examiner

SPIRAL WOUND SEPARATION MEMBRANE MODULE

TECHNICAL FIELD

The present invention relates to a spiral wound separation membrane module. Such a spiral wound separation membrane module can be used for advanced treatment such as concentration of active ingredients for food applications, and removal of hazardous components in water clarification, sewage treatment, and the like.

BACKGROUND ART

Conventionally, a reverse osmosis separation apparatus, an ultrafiltration apparatus, a microfiltration apparatus or the like with use of membrane separation has been used for separating components in a liquid mixture. Specifically, in a fluid separation apparatus, a pressurized feed-source fluid is introduced thereinto separate a permeation fluid that passes through the membrane and is guided to a porous hollow tube, and a remaining concentrated fluid. In such a liquid separation apparatus, a spiral wound separation membrane module (hereinafter also referred to as "membrane module") having a plurality of spiral wound separation membrane elements (hereinafter also referred to as "membrane element") is frequently used.

For example, FIG. 1 shows an example of a conventional membrane module using three membrane elements. As shown in the sectional view of FIG. 1, a conventional membrane module 1 has a structure in which three membrane elements 3 are connected and accommodated in a cylindrical container 2. The membrane element 3 has a structure in which a laminated body having a separation membrane, a feed-side spacer and a permeation-side spacer is wound around a porous hollow tube 4 in a spiral shape, the feed-side spacer is positioned on a feed side of the separation membrane, the permeation-side spacer is positioned on a permeation side of the separation membrane, and a feed-side flow path and a permeation-side flow path are sealed so as not to communicate directly with each other. In the three membrane elements 3, the ends of the hollow tubes 4 are connected in series to each other by an inner joint 5 and accommodated in the cylindrical container 2. At the end of the hollow tube 4 on a feed-source fluid inlet 6 side, a seal stopper 7 is provided so that the feed-source fluid does not enter the hollow tube 4, while the end of the hollow tube 4 on a permeation fluid outlet 8 side is connected to the permeation fluid outlet 8 of the cylindrical container 2 by an end joint 9 so that the concentrated fluid does not come to be mixed in. The concentrated fluid is discharged from a concentrated fluid outlet 10.

However, in such a conventional membrane module 1, there is a possibility that the feed-source fluid or the concentrated fluid may be mixed into the hollow tube 4 from the joint gap of the inner joint 5, the seal stopper 7, or the end joint 9, and thus there has been a disadvantage that the reliability in removing hazardous components is low.

On the other hand, in Patent Document 1, a liquid separation apparatus having a simple structure showing high reliability of pressure resistance as well as having a structure with a high degree of adhesion with no leakage at the joint portion has been proposed using a membrane module that does not require a cylindrical container.

PRIOR ART DOCUMENTS

Patent Documents

Patent Document 1: Japanese patent No. 4688141

SUMMARY OF THE INVENTION

Problems to be Solved by the Invention

The purpose of the present invention is to provide a highly reliable membrane module for removing hazardous components without the risk of a feed-source fluid and a concentrated fluid intermixing inside a hollow tube.

Means for Solving the Problems

As a result of intensive studies to solve the above problems, the inventors of the present invention have found that the above object can be achieved by the following membrane module. The present invention has been completed based on this finding.

That is, the present invention relates to a spiral wound separation membrane module, comprising a spiral wound separation membrane element accommodated in a cylindrical container, the spiral wound separation membrane element having a structure in which a laminated body having a separation membrane, a feed-side spacer and a permeation-side spacer is wound around a porous hollow tube in a spiral shape, the feed-side spacer is positioned on a feed side of the separation membrane, the permeation-side spacer is positioned on a permeation side of the separation membrane, and a feed-side flow path and a permeation-side flow path are sealed so as not to communicate directly with each other; wherein the cylindrical container has a feed-source fluid inlet, a permeation fluid outlet and a concentrated fluid outlet;

the upstream-side end of the hollow tube is closed off integrally with the tube side surface; and the downstream-side end of the hollow tube protrudes to the outside via the permeation fluid outlet in the cylindrical container.

The cylindrical container has one permeation fluid outlet at each end; two spiral wound separation membrane elements are accommodated in the cylindrical container; and the downstream-side end of each hollow tube of each spiral wound separation membrane element may be in the form protruding to the outside via each permeation fluid outlet in the cylindrical container. By adopting this form, the water permeation efficiency can be improved.

Effect of the Invention

The membrane module of the present invention does not use inner joints, plugs, and end joints unlike the conventional membrane module, so there is no risk of contamination of the feed-source fluid or concentrated fluid in the hollow tube and there is high reliability in removing hazardous components.

MODE FOR CARRYING OUT THE INVENTION

Hereinafter, modes for carrying out the present invention will be described with reference to the drawings.

Figure 1:
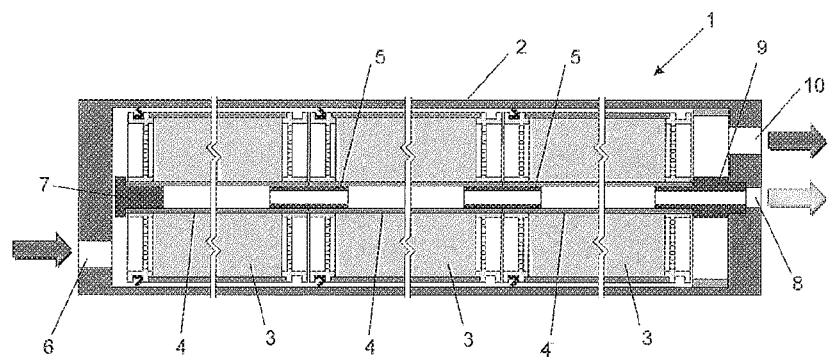
FIG. 1 is a cross-sectional view showing an example of a conventional membrane module.
Figure 2:
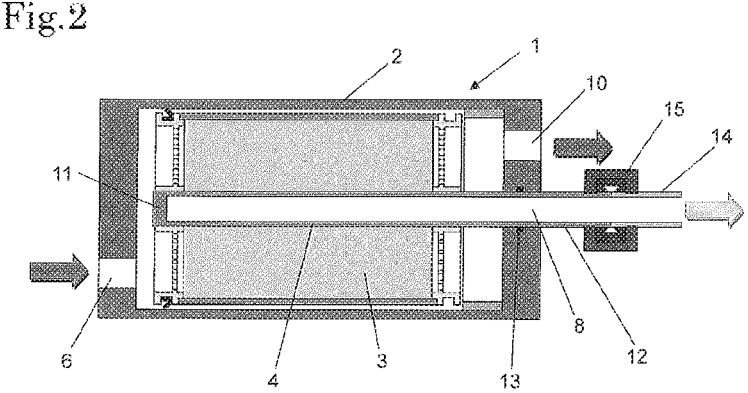
FIG. 2 is a cross-sectional view showing an example of a membrane module of the present invention.

FIG. 2 is a cross-sectional view showing an example of the membrane module of the present invention. A membrane module 1 is one in which one membrane element 3 is accommodated in a cylindrical container 2. The cylindrical container 2 has a feed-source fluid inlet 6, a permeation fluid outlet 8, and a concentrated fluid outlet 10. The membrane element 3 has a general structure other than a hollow tube 4. Specifically, the membrane element 3 has a structure in which a laminated body having a separation membrane, a feed-side spacer and a permeation-side spacer is wound around a porous hollow tube 4 in a spiral shape, the feed-side spacer is positioned on a feed side of the separation membrane, the permeation-side spacer is positioned on a permeation side of the separation membrane, and a feed-side flow path and a permeation-side flow path are sealed so as not to communicate directly with each other.

The hollow tube 4 has a hole(s) (not shown) for passing the permeation fluid through the tube at the portion where the laminated body is wound, an upstream-side end 11 thereof being integrally closed with the tube side face and a downstream-side end 12 thereof protruding to the outside via the permeation fluid outlet 8 in the cylindrical container 2. It is preferable that a seal member 13 (for example, an O-ring or the like) for sealing a gap with the hollow tube 4 is provided inside the permeation fluid outlet 8. Further, the downstream-side end 12 may have a joining member 15 for joining to an external piping 14.

By adopting the above-described structure of the membrane module 1, there is no possibility that the feed-source fluid or the concentrated fluid will be mixed in the hollow tube 4, so that the reliability in removing hazardous components is improved.

Figure 3:
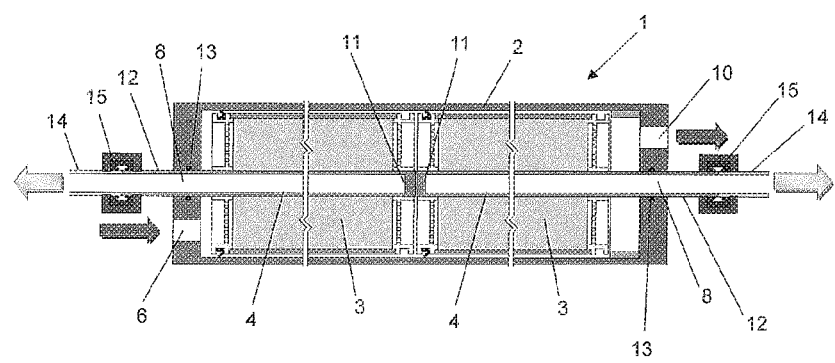
FIG. 3 is a cross-sectional view showing another example of a membrane module of the present invention.

FIG. 3 is a cross-sectional view showing another example of the membrane module of the present invention. The description overlapping with the description in FIG. 2 is omitted. The membrane module 1 is one in which two membrane elements 3 are accommodated in the cylindrical container 2. The cylindrical container 2 has one permeation fluid outlet 8 at each end. The two membrane elements 3 are accommodated in the cylindrical container 2 in such a manner that the upstream-side end 11 of each hollow tube 4 faces each other. The downstream-side end 12 of each hollow tube 4 of the two membrane elements 3 protrudes to the outside via each permeation fluid outlet 8 in the cylindrical container 2.

By adopting the above-described structure of the membrane module 1, there is no possibility that the feed-source fluid or the concentrated fluid will be mixed in the hollow tube 4, so that the reliability in removing hazardous components is improved. Further, since the membrane module 1 accommodates two membrane elements 3, the membrane module 1 is superior in water permeation efficiency to the case where one membrane element 3 is accommodated.

Figure 4:
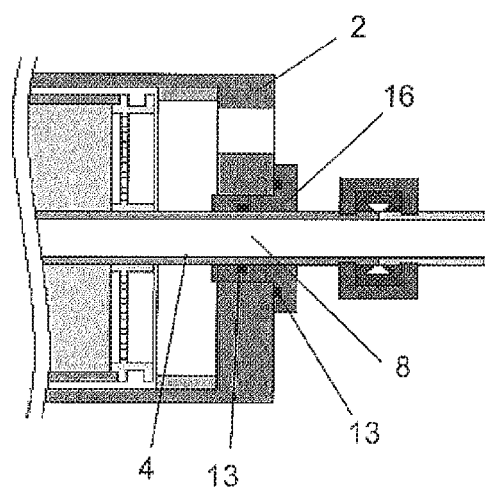
FIG. 4 is a cross-sectional view showing an example of a downstream-side end of a membrane module of the present invention.

FIG. 4 is a cross-sectional view showing an example of a downstream-side end of the membrane module of the present invention. In many cases, the cylindrical container 2 is made of a metal in order to secure pressure resistance, but penetration of the hollow tube 4 in a metal end plate may damage the surface of the hollow tube 4. In particular, when there is a groove for providing the seal member 13 in the permeation fluid outlet 8, there is a high risk that the hollow tube 4 is scratched. By providing a resin-made protective sleeve 16 in the permeation fluid outlet 8, it is possible to prevent the hollow tube 4 from being scratched.

Although the representative embodiments of the membrane module of the present invention have been described above, the present invention is not limited to the above embodiments, and any structure suitable for various uses can be appropriately adopted.

INDUSTRIAL APPLICABILITY

The membrane module of the present invention can be used for advanced treatment such as concentration of active ingredients for food applications, removal of hazardous components in water clarification and sewage treatment, and the like.

DESCRIPTION OF REFERENCE SIGNS

1: Spiral wound separation membrane module
2: Cylindrical container
3: Spiral wound separation membrane element
4: Hollow tube
5: Inner joint
6: Feed-source fluid inlet
7: Seal stopper
8: Permeation fluid outlet
9: End joint
10: Concentrated fluid outlet
11: Upstream-side end
12: Downstream-side end
13: Seal member
14: External piping
15: Joining member
16: Protective sleeve

The invention claimed is:

1. A spiral wound separation membrane module, comprising a spiral wound separation membrane element accommodated in a cylindrical container, the spiral wound separation membrane element having a structure in which a laminated body having a separation membrane, a feed-side spacer and a permeation-side spacer is wound around a porous hollow tube in a spiral shape, the feed-side spacer is positioned on a feed side of the separation membrane, the permeation-side spacer is positioned on a permeation side of the separation membrane, and a feed-side flow path and a permeation-side flow path are sealed so as not to communicate directly with each other; wherein
the cylindrical container has a feed-source fluid inlet, a permeation fluid outlet and a concentrated fluid outlet;
the upstream-side end of the hollow tube is closed off integrally with the tube side surface; the downstream-side end of the hollow tube protrudes to the outside via the permeation fluid outlet in the cylindrical container;
wherein the cylindrical container has one permeation fluid outlet at each end; two spiral wound separation membrane elements are accommodated in the cylindrical container; and the downstream-side end of each hollow tube of each spiral wound separation membrane element protrudes to the outside via each permeation fluid outlet in the cylindrical container.

* * * * *